(12) United States Patent
Yuan et al.

(10) Patent No.: US 12,216,904 B2
(45) Date of Patent: Feb. 4, 2025

(54) MEMORY BUFFER MANAGEMENT ON HARDWARE DEVICES UTILIZING DISTRIBUTED DECENTRALIZED MEMORY BUFFER MONITORING

(71) Applicant: Microsoft Technology Licensing, LLC, Redmond, WA (US)

(72) Inventors: Yi Yuan, Redmond, WA (US); Narayanan Ravichandran, Bellevue, WA (US); Robert Groza, Jr., Redmond, WA (US); Yevgeny Yankilevich, Tirat Carmel (IL); Hari Daas Angepat, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/600,150

(22) Filed: Mar. 8, 2024

(65) Prior Publication Data
US 2024/0211139 A1    Jun. 27, 2024

Related U.S. Application Data

(63) Continuation of application No. 17/943,669, filed on Sep. 13, 2022, now Pat. No. 11,947,802.

(51) Int. Cl.
*G06F 3/06* (2006.01)
(52) U.S. Cl.
CPC .......... *G06F 3/0611* (2013.01); *G06F 3/0656* (2013.01); *G06F 3/0673* (2013.01)
(58) Field of Classification Search
CPC .... G06F 3/0611; G06F 3/0656; G06F 3/0673; G06F 9/4806; G06F 9/4843; G06F 9/5016; G06F 9/5022; G06F 12/0253; G06F 12/0261; G06F 2209/483; G06F 2209/5011; G06F 2209/5018; G06F 2209/509; F06F 2212/1024; F06F 2212/1044

See application file for complete search history.

(56) References Cited

U.S. PATENT DOCUMENTS

| | | | |
|---|---|---|---|
| 8,661,223 B1* | 2/2014 | Solt | G06F 12/023 711/170 |
| 11,593,169 B2* | 2/2023 | Chisnall | G06F 9/355 |
| 2011/0246727 A1* | 10/2011 | Dice | G06F 12/0261 711/219 |
| 2013/0061009 A1* | 3/2013 | Kumar | G06F 12/023 711/E12.002 |

OTHER PUBLICATIONS

Notice of Allowance mailed on Dec. 20, 2023, in U.S. Appl. No. 17/943,669, 7 pages.

* cited by examiner

*Primary Examiner* — Aracelis Ruiz
(74) *Attorney, Agent, or Firm* — Ray Quinney & Nebeker; Christopher Hallstrom

(57) ABSTRACT

The present disclosure relates to utilizing a buffer management system to efficiently manage and deallocate memory buffers utilized by multiple processing roles on computer hardware devices. For example, the buffer management system utilizes distributed decentralized memory buffer monitoring in connection with augmented buffer pointers to deallocate memory buffers accurately and efficiently. In this manner, the buffer management system provides an efficient approach for multiple processing roles to consume source data stored in a memory buffer and to deallocate the buffer only after all roles have finished using it.

20 Claims, 8 Drawing Sheets

MEMORY BUFFER MANAGEMENT ON HARDWARE DEVICES UTILIZING DISTRIBUTED DECENTRALIZED MEMORY BUFFER MONITORING

CROSS-REFERENCE TO RELATED APPLICATIONS

This application is a Continuation of U.S. application Ser. No. 17/943,669, filed on Sep. 13, 2022, the entirety of which is incorporated herein by reference.

BACKGROUND

Several computer hardware devices include various components, called processing roles (or simply roles) that provide a variety of services for processing data. For example, a role reads and processes input data to generate desired output data. Often, a role reads input data stored in a hardware-managed memory buffer within a memory buffer pool (e.g., a centralized buffer pool). In addition, roles are able to allocate, read, write, and deallocate memory buffers in the memory buffer pool. For instance, a role commonly allocates a buffer to hold incoming data, performs a number of reads and writes to carry out its functionality, and then deallocates the buffer.

Commonly, multiple roles share access to the same memory buffer. However, problems regularly occur when multiple roles read or consume input data from the same memory buffer. For example, one role deallocates a memory buffer before other roles have finished accessing the input data stored in the buffer. As a result, many roles fail to fully process the input data, which leads to additional potential problems, such as failing to provide accurate output data, needing to re-request and receive the input data, and processing deadlock.

Determining and managing what roles are needed to access a memory buffer is often a complex task. Indeed, the number of roles needed to consume input data in a memory buffer, the order that roles consume the data, and the time needed for each of the roles to consume the data are not known until runtime. Further, because roles operate independently, even after determining this information for one role, it is not shared among roles. Accordingly, with existing computer systems, it is very difficult to determine whether a role is the last one to access data in a memory buffer and when a role should deallocate the buffer.

To address these issues, existing computer systems have implemented various approaches. For example, some existing computer systems do not have roles deallocate a memory buffer. This leads to stale input data sitting in memory buffers long past when they are being used. As another approach, some existing computer systems copy the buffer data as many times as there are roles to consume it. For instance, if three roles need to consume the same data, then three data buffers are allocated to store three copies of the same data. Here, each role deallocates its own buffer once it has completed processing. However, this approach requires using a large amount of bandwidth and memory to create full copies of the input data, which is not feasible when scaling to modern-day processing needs (e.g., especially as incoming data and processing needs double every few years). Further, this approach adds significant latency when copying data between multiple memory buffers.

In another approach, some existing computer systems use synchronization between roles. In one example, one role controls or "owns" the memory buffer at a time and passes control to another role. This requires waiting for each role to operate in serial and modifying roles to be aware of what roles are needed as well as what roles still remain. In another example, roles utilize a centralized controller to synchronize between the roles. Here, the central controller uses active communications between the centralized controller and each role to determine when each role has finished using the memory buffer, at which point the buffer is deallocated. This requires multiple additional back-and-forth communications and removes independence from roles. Moreover, a centralized controller introduces increased complexity and processing requirements while also reducing parallel processing and jeopardizing performance. Moreover, as processing needs increase, an active centralized synchronization is unable to efficiently scale and becomes a processing roadblock.

These and other problems result in significant inefficiencies, inaccuracies, and inflexibilities of existing systems regarding managing memory buffers on computer hardware devices.

BRIEF DESCRIPTION OF THE DRAWINGS

The detailed description provides one or more implementations with additional specificity and detail through the use of the accompanying drawings, as briefly described below.

DETAILED DESCRIPTION

Figure 1:
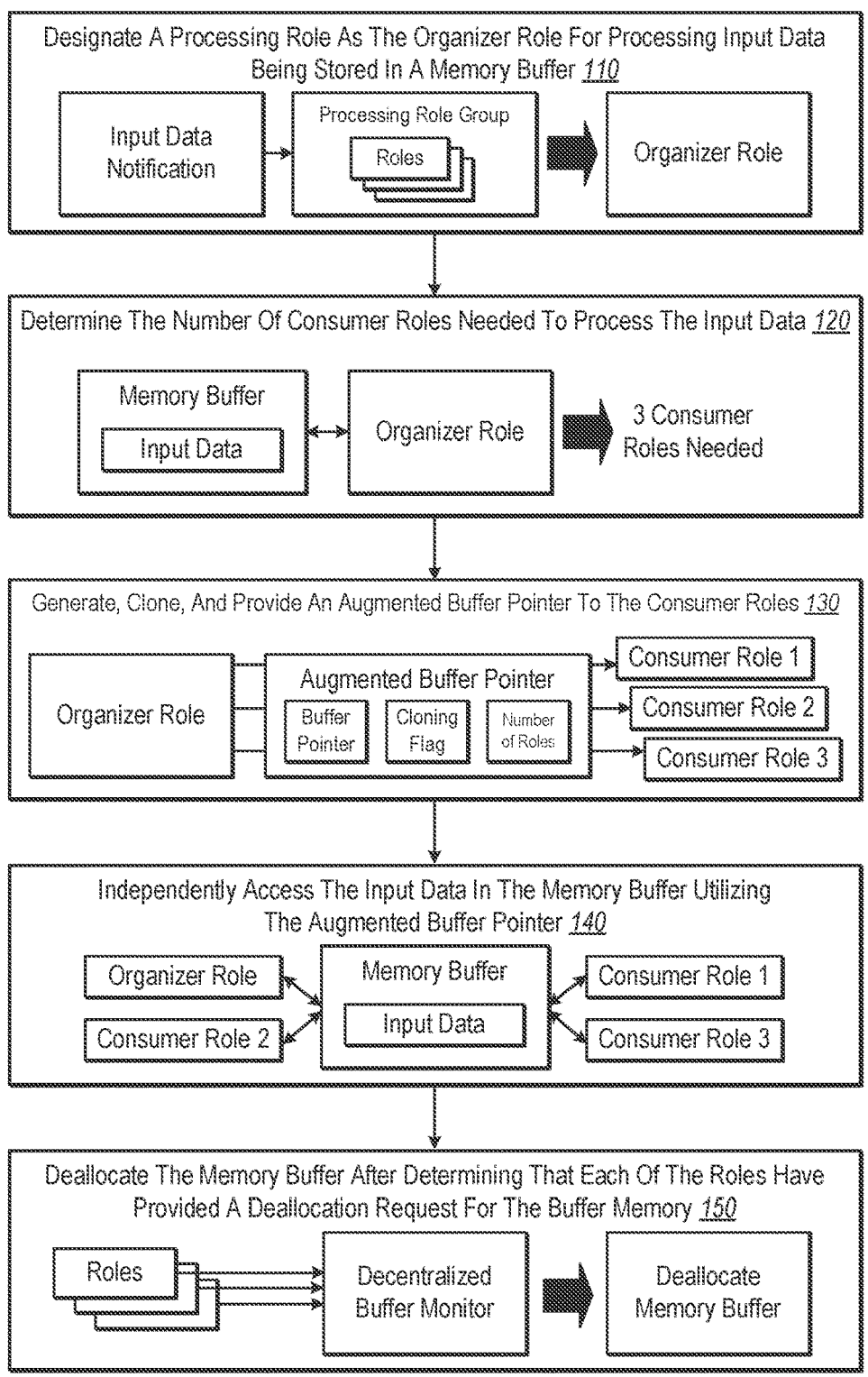
FIG. 1 illustrates an example overview of a buffer management system for managing memory buffers consumed by multiple processing roles in accordance with one or more implementations.

Implementations of the present disclosure provide benefits and/or solve one or more of the foregoing or other problems in the art with devices, systems, and/or methods that utilize a buffer management system (i.e., a memory buffer management system) to efficiently manage and deallocate memory buffers utilized by multiple processing roles on computer hardware devices. In particular, the buffer management system utilizes distributed decentralized memory buffer monitoring in connection with augmented buffer pointers to accurately and efficiently deallocate memory buffers. In this manner, the buffer management system provides an efficient approach for multiple processing roles (or simply "roles") to concurrently consume source data stored in a memory buffer while also only deallocating the buffer only after all roles have finished using it.

To elaborate, in one or more implementations, the buffer management system receives an indication that input data is stored at a memory buffer of a pool of memory buffers waiting to be processed. For example, upon a first role receiving a buffer pointer pointing to the memory buffer, the role designates itself as an organizer role and determines, based on the input data, the number of consumer roles (e.g., additional roles) needed to process the input data. In addition, the buffer management system causes the organizer role to generate an augmented buffer pointer that includes the received buffer pointer, a buffer pointer cloning indicator, and the number of total roles needed to process the input data. Further, in various instances, the organizer role provides cloned versions of the augmented buffer pointer to the consumer roles such that each consumer role may independently process the input data.

Upon each of the organizer roles and the consumer roles completing their processing of the input data, in various implementations, each role sends a deallocation request. For example, the buffer management system receives each deallocation request (e.g., via a buffer monitor) and updates a buffer deallocation value. When the number of received deallocation requests matches the total number of roles from the augmented buffer pointer, the buffer management system determines that all roles have finished processing the input data and safely deallocates the memory buffer. In this manner, the buffer management system guarantees that a memory buffer is deallocated exactly once and only after all roles have finished using the buffer.

As described herein, the buffer management system provides several technical benefits in terms of computing efficiency, accuracy, and flexibility compared to existing computing systems. Indeed, the buffer management system provides several practical applications that deliver benefits and/or solve problems associated with memory buffer management.

To elaborate, in various implementations, the buffer management system improves efficiency by deallocating a memory buffer after all roles accessing the buffer have signaled that they have finished using the buffer. For example, in certain implementations, the buffer management system utilizes an augmented buffer pointer to indicate when a buffer pointer has been cloned and provided to multiple roles as well as the total number of roles accessing input data in the memory buffer. Unlike existing computer systems that make full copies of a memory buffer for each role, which can require significant amounts of memory, the buffer management system only clones or copies the buffer pointer, which is a few bytes of data at most.

In addition, in various implementations, the buffer management system utilizes a decentralized and distributed buffer monitor in connection with the augmented buffer pointer to provide improved efficiency over existing computer systems. To illustrate, in some implementations, the buffer monitor maintains a small passive memory buffer deallocation table that includes an entry for each memory buffer. As each role provides a single deallocation request for a shared memory buffer, the buffer management system updates a deallocation number for the buffer. Then, when the deallocation number matches the total number of roles indicated in an augmented buffer pointer received with a deallocation request, the buffer management system is able to quickly deallocate the buffer knowing that all processing has been completed. In this manner, the memory buffer is safely made available for receiving and processing new incoming data.

Moreover, unlike conventional systems that require an active centralized controller to actively track the number and progress of each role accessing a shared memory buffer, the buffer management system utilizes a small decentralized and distributed buffer monitor that passively detects when a memory buffer is no longer in use. Additionally, the buffer management system easily scales to accommodate any amount of incoming data as it does not require complex instructions, does not incur buffer bandwidth or time to make multiple copies of a buffer, and does not need to determine how long each role needs to access the buffer beforehand. Further, the buffer management system allows roles to process data independently, in parallel, according to their own timing, and in their own order.

In addition to the improved efficiencies described above, the buffer management system also provides improved accuracy and flexibility over existing computer systems. Regarding accuracy, the buffer management system ensures that each role reads and consumes the memory buffer for as long as it needs without the worry of another role prematurely deallocating the buffer. With respect to flexibility, by providing cloned versions of the augmented buffer pointer to each role, the buffer management system allows each role to operate independently (and in parallel) without needing to create multiple copies of the buffer. In this manner, the buffer management system enables each role to "own" the memory buffer at the same time and for as long as needed.

As illustrated in the foregoing discussion, the present disclosure utilizes a variety of terms to describe the features and advantages of one or more implementations described herein. For instance, as used herein, operations of the buffer management system utilize one or more processing engines. Accordingly, the terms "computer hardware device" or "hardware device" refer to a computing device, hardware, and/or system that receives and processes incoming data (e.g., source data) to generate output data. For example, a computer hardware device includes a memory, such as a pool of memory buffers, for storing incoming data (e.g., data packets). In addition, the computer hardware device includes one or more processors for processing the incoming data to generate output data.

As used herein, the terms "memory buffer," "buffer memory," and "buffer" refer to a hardware-managed memory that is mappable and accessible to various systems and hardware components. For example, a buffer memory stores data transferring between components and/or systems. By storing data in a memory buffer, the buffer allows for differing transfer speeds between a data sender and a data receiver. In various implementations, a memory buffer stores data temporarily and is located in the random-access memory (RAM) and/or main memory. As used herein, the terms "memory buffer pool" and "buffer pool" refer to a group of multiple memory buffers. In some instances, a buffer pool is located in an area of main memory that is allocated for temporarily storing data.

As used herein, the terms "input data" and "source data" refer to a data structure received by the host computing device and placed in a memory buffer. Similarly, the term "output data" refers to data generated by the computer hardware device from the input data.

As used herein, the term "buffer pointer" refers to data that indicates the address or location of a target memory buffer. For example, the buffer pointer indicates which memory buffer in the memory buffer pool includes particular input data to be processed. In various implementations, an allocator generates and/or provides a buffer pointer to a processing role. By using the buffer pointer, processing roles have access to the input data at a target memory buffer.

As used herein, the term "augmented buffer pointer" refers to a data structure that includes a buffer pointer along with augmented data used by multiple processing roles. In many implementations, an augmented buffer pointer includes a buffer pointer, a buffer pointer cloning indicator, and/or a role number value indicating the number of processing roles needed to process the input data. For example, an organizer role generates and clones one or more instances of the augmented buffer pointer and provides them to one or more consumer roles. In various implementations, a processing role includes the augmented buffer pointer when sending a deallocation request to signal deallocating a target memory buffer.

As used herein, the term "buffer pointer cloning indicator" refers to a data structure indicating whether an augmented buffer pointer has been cloned. When an organizer role determines to clone and provide the augmented buffer pointer to additional processing roles (e.g., consumer roles), the organizer role sets the buffer pointer cloning indicator to true. For example, the buffer pointer cloning indicator is a binary bit or flag (e.g., "IsCloned") set to true (or vice versa) when the augmented buffer pointer is cloned.

As used herein, the terms "total role number value," "role number value," and "total number of roles" refer to a count value of processing roles determined to process a given input data. In some implementations, the total role number value (e.g., NumClones, NumAllocs, or NumRoles) is an integer value specifying the number of roles needed to read from a target memory buffer. In some instances, the organizer role (or sub-organizer role) determines how many processing roles are needed to process the input data by accessing a target memory buffer and generating output data. In various implementations, the total role number value includes the organizer role. In alternative implementations, the organizer role is not included if it does not need to access the input data in the target memory buffer.

As used herein, the term "processing roles" or simply "roles" refers to a hardware or software component that processes input data. For example, a computer hardware device includes various different components called roles that implement various services and/or provide processing operations. In many instances, a role allocates, reads, consumes, writes, and/or deallocates a memory buffer that stores input data.

As used herein, the terms "organizer processing role" or simply "organizer role" refer to a single, designated role of the roles. In various implementations, the organizer role is self-designated. In some instances, an organizer role is otherwise designated. As described below, an organizer role generates an augmented buffer pointer and provides cloned versions to consumer roles needing to read input data from a shared memory buffer.

As used herein, the terms "consumer processing role" or simply "consumer role" refer to a role that is provided an augmented buffer pointer by an organizer role and that reads input data from the shared memory buffer indicated in the augmented buffer pointer (i.e., via the buffer pointer). In many implementations, the organizer role and each of the consumer roles operate independently from each other.

As used herein, the terms "buffer monitor" or "decentralized buffer monitor" refer to a data structure that operates in connection with augmented buffer pointers. For example, a buffer monitor is a component that includes a table that monitors the deallocation status of memory buffers in a memory buffer pool. In many implementations, the buffer monitor passively monitors the deallocation status of memory buffers based on receiving deallocation requests from roles (e.g., an organizer role and one or more consumer roles) with respect to a currently allocated memory buffer. In various implementations, the buffer monitor is decentralized and distributed, meaning that it is location agnostic within the computer hardware device and it passively reacts to received signals rather than actively sends signals to monitor the status of roles and the allocation states of memory buffers.

Additional details will now be provided regarding the components and elements of the buffer management system (i.e., a memory buffer management system). For example, FIG. 1 illustrates an example overview of a buffer management system for managing memory buffers consumed by multiple processing roles in accordance with one or more implementations. As shown, FIG. 1 illustrates a series of acts 100 performed by the buffer management system. In various implementations, the series of acts 100 corresponds to a computer hardware device receiving input data to be processed.

In particular, the series of acts 100 in FIG. 1 includes an act 110 of designating a processing role as the organizer role for processing input data being stored in a memory buffer. In various implementations, the buffer management system designates a role to be an organizer role. For example, an indication is provided to a role within a group of processing roles to process the input data temporarily stored in a memory buffer within a buffer pool. In response, in various implementations, the role that receives the indication (e.g., a buffer pointer) designates itself as an organizer role. In this manner, only a single role is designated as an organizer role for the input data on a target memory buffer. Additional details regarding designating an organizer role are provided below with respect to FIGS. 2, 3A, and 3B.

As shown, the series of acts 100 includes an act 120 of determining the number of consumer roles needed to process the input data. In some instances, the buffer management system determines, based on initially analyzing the input data, the type and number of roles needed to process the input data. For example, the organizer role determines the number of additional roles needed to read from the target memory buffer, which are designated as consumer roles. Additional details regarding determining and designating consumer roles are provided below with respect to FIGS. 2, 3A, and 3B.

Additionally, the series of acts 100 includes an act 130 of generating, cloning, and providing an augmented buffer pointer to the consumer roles. In various implementations, the buffer management system generates and provides a clone of the augmented buffer pointer to each consumer role, which enables the consumer role to access the memory buffer and process the input data. For example, the buffer management system causes the organizer role to generate multiple copies of an augmented buffer pointer, which includes the buffer pointer, a buffer pointer cloning indicator (i.e., a cloning flag), and a total role number value (i.e., the number of clones). Additionally, the organizer role provides each consumer role with a copy or clone of the augmented buffer pointer. Additional details regarding generating and providing augmented buffer pointers are provided below in connection with FIGS. 2, 3A, 3B, 4A, and 4B.

As shown, the series of acts 100 includes an act 140 of independently accessing the input data in the memory buffer utilizing the augmented buffer pointer. In one or more implementations, the buffer management system enables the organizer role as well as the consumer roles to each read and consume, independently, the input data from the target memory buffer. For example, each role utilizes the memory buffer from the augmented buffer pointer to identify and access the correct memory buffer where the input data is being stored. Additional details regarding independently consuming the memory buffer are provided below in connection with FIGS. 3A and 3B.

Further, the series of acts 100 includes an act 150 of deallocating the memory buffer after determining that each of the roles has provided a deallocation request for the memory buffer. In one or more implementations, the buffer management system determines that each role that needs to access the memory buffer has finished reading the input data and that the memory buffer can now be safely deallocated. For example, the buffer management system utilizes a lightweight buffer monitor that passively determines when the roles (e.g., the organizer role and the consumer roles) accessing the target memory buffer have each sent a deallocation signal. In various implementations, the buffer management system utilizes a decentralized buffer monitor to determine when the number of received reallocation requests from the processing roles matches the total number of roles included in the augmented buffer pointer. Additional details regarding determining when to deallocate a memory buffer are provided below in connection with FIGS. 3A and 3B.

Figure 2:
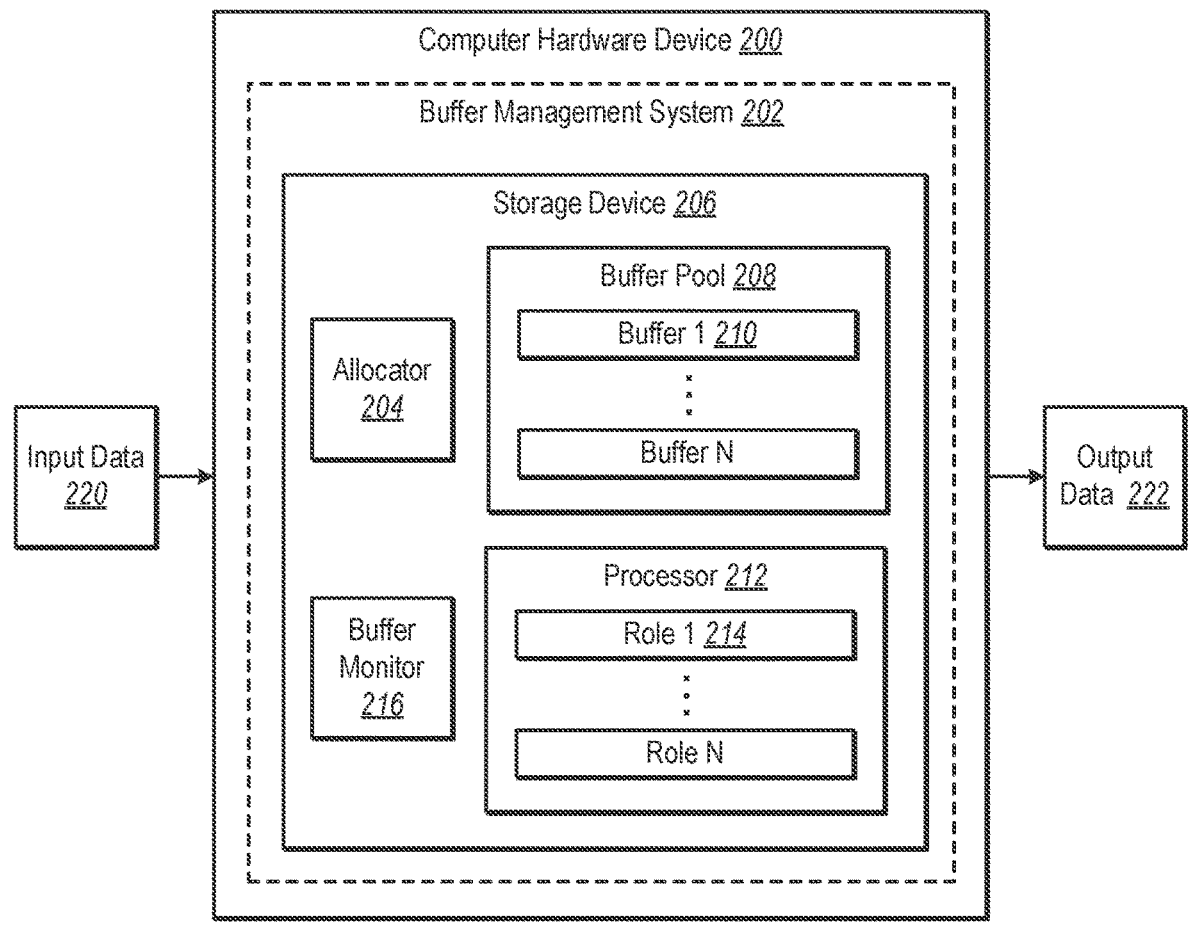
FIG. 2 illustrates a diagram of a computer hardware device where the buffer management system is implemented in accordance with one or more implementations.

Turning to FIG. 2, this figure shows an example computer hardware device. In particular, FIG. 2 illustrates a diagram of a computer hardware device where the buffer management system is implemented in accordance with one or more implementations. As shown, FIG. 2 includes a computer hardware device 200 that receives input data 220 and generates output data 222. In some implementations, the input data 220 and/or the output data 222 is associated with an external computing device (e.g., the input data 220 is a network packet). In alternative implementations, the input data 220 and/or the output data 222 corresponds to the transfer of data within the computer hardware device 200.

As shown, the computer hardware device 200 includes the buffer management system 202 (i.e., a memory buffer management system). In some implementations, the buffer management system 202 corresponds to a collection of hardware components configured to perform various operations, as described herein. In one or more implementations, the buffer management system 202 includes software instructions to perform various operations. In certain implementations, the buffer management system 202 includes a combination of hardware and software functions. Accordingly, the components described in connection with the buffer management system 202 may be hardware components, software components, or a combination of both.

As shown, the buffer management system 202 includes an allocator 204, a storage device 206, a processor 212, and a buffer monitor 216. As also shown, the storage device 206 includes a buffer pool 208 having memory buffers 210 (shown as Buffer 1-Buffer N). The processor 212 includes roles 214 (shown as Role 1-Role N) for processing data temporarily stored in the memory buffers.

As illustrated, the allocator 204, the storage device 206, the processor 212, and the buffer monitor 216 are located in the storage device 206. In some implementations, the allocator 204 and/or the buffer monitor 216 are located outside of the storage device 206. In various implementations, the allocator 204 and the buffer monitor 216 are combined and/or the buffer monitor 216 is part of the allocator 204.

In various implementations, the storage device 206 includes RAM stored on the main memory of the computer hardware device 200. For instance, the storage device 206 includes volatile memory for temporarily storing data. For example, the buffer pool is maintained within the volatile memory. In some implementations, the storage device 206 includes non-volatile memory for longer-term storage of data.

In one or more implementations, the allocator 204 allocates input data to one or more of the memory buffers 210 in the buffer pool 208 (e.g., a central buffer pool). In addition, in various instances, the allocator 204 generates and provides a buffer pointer that indicates the corresponding memory buffer location. For example, the allocator 204 stores received input data in the first buffer (i.e., Buffer 1), generates a buffer pointer that includes the address of the first buffer and provides the buffer pointer to one of the roles 214.

In some implementations, the buffer pool 208 maintains a number of memory buffers 210. As noted above, each of the memory buffers 210 temporarily stores data (e.g., input data or source data) to be processed. The buffer pool 208 can include any number of memory buffers 210.

In sample implementations, the processor 212 processes the input data 220 to generate the output data 222. For example, the processor 212 includes roles 214 that provide a variety of functions for delivering services. For instance, some roles receive indications of input data while other roles provide specific types of functions. In many instances, multiple roles are needed to fully process input data and generate output data. Additionally, while the roles 214 act independently, in some instances, a role communicates and/or passes data to another role via role-to-role communications).

In various implementations, when multiple roles are needed to process input data in one of the memory buffers 210, the buffer management system 202 designates one of the roles 214 as the organizer role and the other roles as consumer roles. In some implementations, the organizer role is first determined and/or designated, which in turn determines the number of consumer roles needed to generate the output data 222 from the input data 220 stored in one of the memory buffers 210.

In various implementations, the buffer monitor 216 is a component for effectively deallocating memory buffers 210. Among one or more implementations, the buffer monitor 216 passively monitors when a memory buffer is ready to be deallocated based on receiving one or more augmented buffer pointers from one or more roles. In this manner, the buffer management system 202 quickly and efficiently deallocates a memory buffer once and after each role accessing the memory buffer has completed reading the input data in the memory buffer.

In some implementations, the buffer monitor 216 includes a buffer deallocation table that passively tracks when the last role accessing a target memory buffer has sent a deallocation request to deallocate a target memory buffer. For example, in various instances, the buffer deallocation table includes a row for each memory buffer in the buffer pool 208 (e.g., a central buffer pool). In each row, the buffer deallocation table includes a first entry for whether multiple roles are accessing the memory buffer (e.g., IsCloned), a second entry indicating the number of roles accessing the memory buffer (e.g., NumClones, NumAllocs, or NumRoles), and/or a third entry indicating the number of deallocation requests received from the roles (e.g., NumDeallocs). In some implementations, a row includes different, fewer, or additional entries. For example, a row does not include an IsCloned entry but rather sets the NumClones entry to 0 when IsCloned is false.

In alternative implementations, the buffer management system 202 otherwise uses the buffer monitor 216 to track the deallocation information in each buffer in the buffer pool 208. Additional information regarding how the buffer management system 202 utilizes the buffer monitor 216 to passively monitor and efficiently deallocate memory buffers is provided in connection with FIGS. 3A-3B.

Figure 3A:
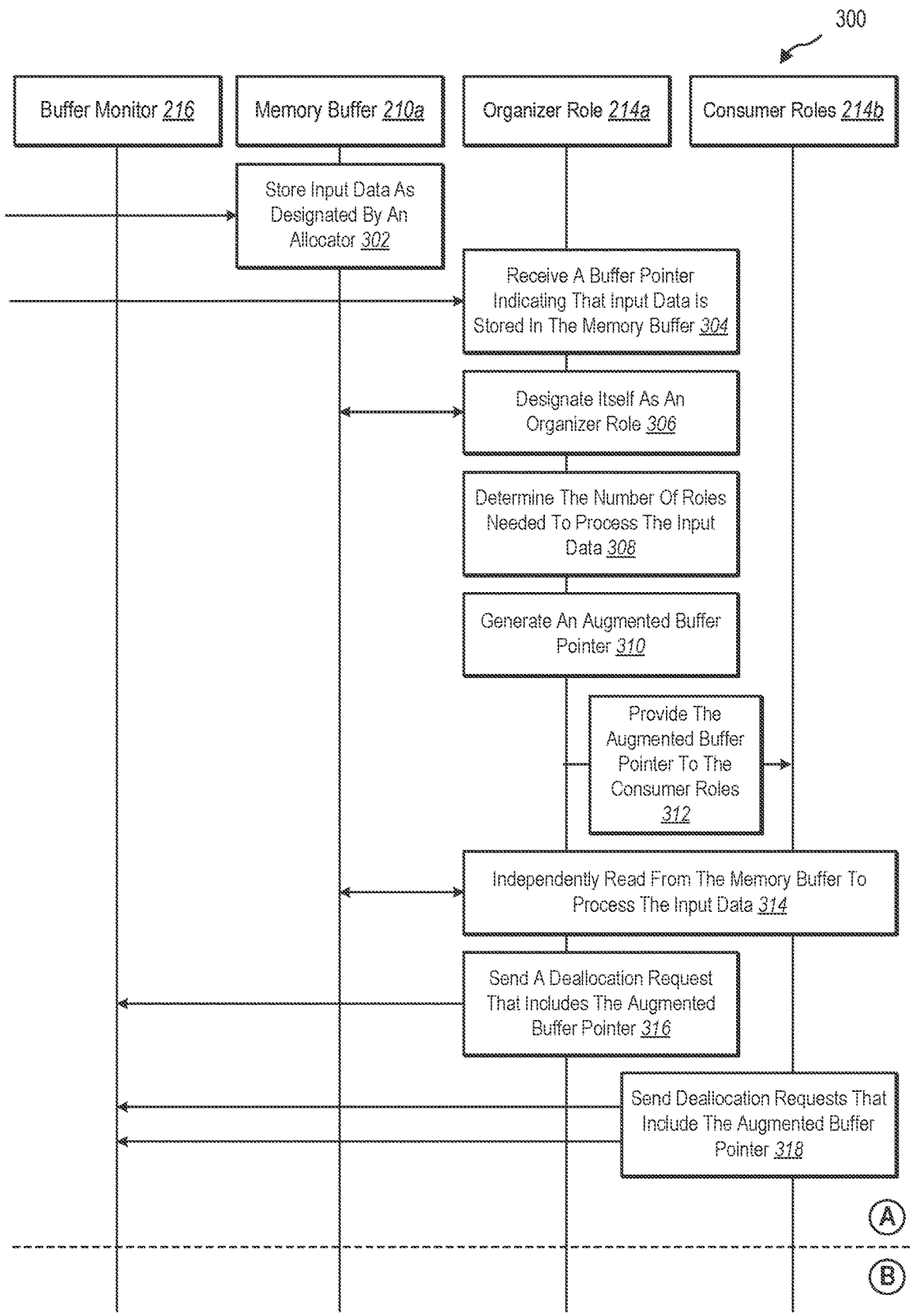
FIG. 3A-3B illustrate a sequence diagram of multiple processing roles accessing input data in a memory buffer and efficiently deallocating the memory buffer with the last processing role in accordance with one or more implementations.
Figure 3B:
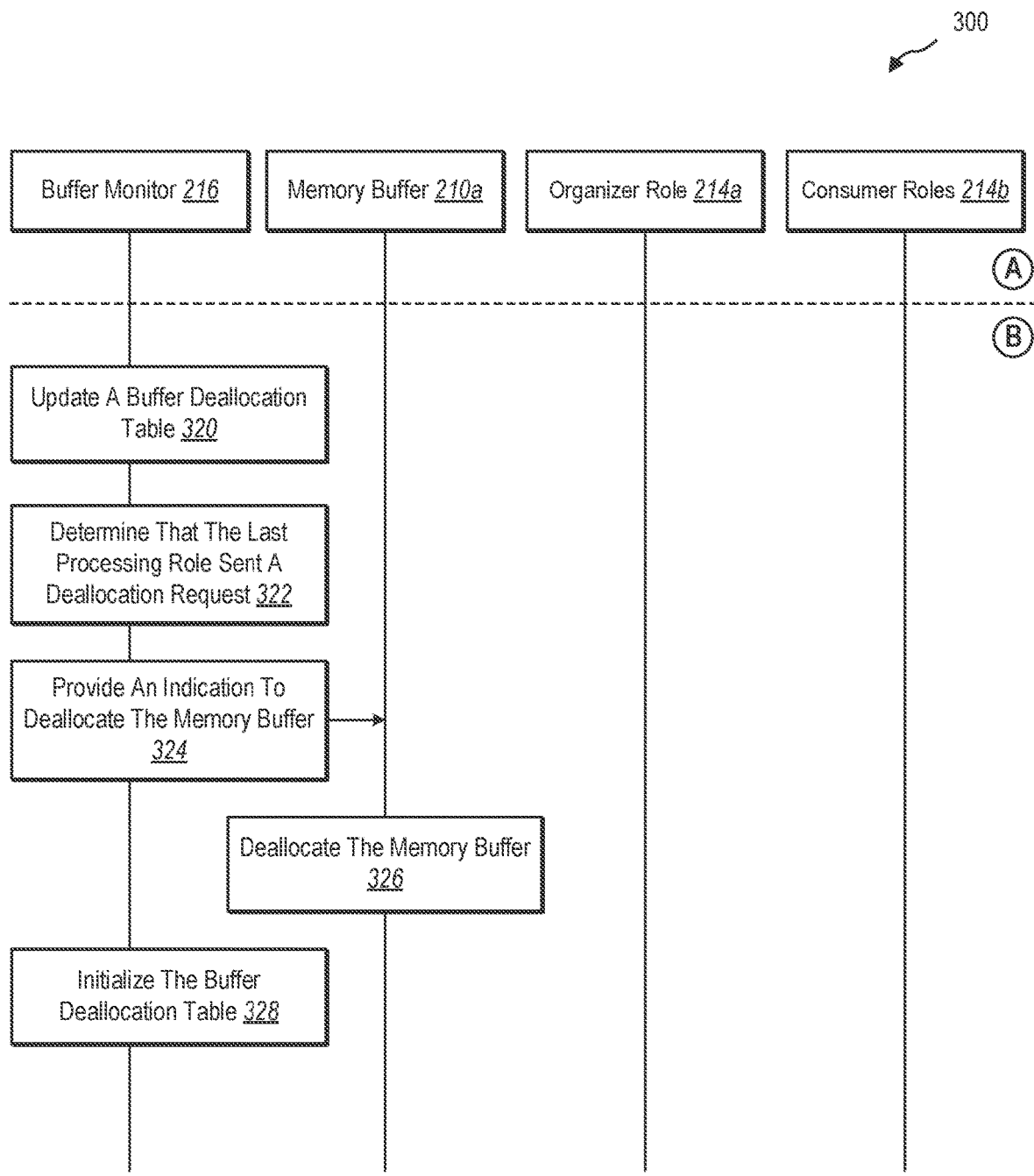

Turning now to FIGS. 3A-3B, these figures illustrate a sequence diagram of multiple processing roles accessing input data in a memory buffer and efficiently deallocating the memory buffer with the last processing role in accordance with one or more implementations. As shown, FIGS. 3A-3B includes a sequence diagram of a series of acts 300 between components of the buffer management system 202 introduced above with respect to FIG. 2. For example, FIGS. 3A-3B include a memory buffer 210a, which represents one of the memory buffers 210 of the buffer pool 208. FIGS. 3A-3B also include an organizer role 214a and consumer roles 214b, which represent a subset of roles 214 (e.g., processing roles). Additionally, FIGS. 3A-3B includes the buffer monitor 216 introduced above.

As shown, the series of acts 300 includes an act 302 of the memory buffer 210a storing input data received from a source. For example, when input data is received at a computing device, an allocator directs the input data to an available memory buffer for processing. Accordingly, the memory buffer 210a temporarily stores input data (e.g., source data) for processing. As noted above, in some implementations, a memory buffer stores data that is being transferred between two components of a computing device.

As also shown, the series of acts 300 includes an act 304 of the organizer role 214a receiving a buffer pointer indicating that input data is stored in the memory buffer. In some instances, in connection with storing input data in the memory buffer 210a, the buffer management system 202 (e.g., the allocator or memory buffer pool) generates a buffer pointer that includes the address or location of the memory buffer. Additionally, as indicated by the arrow on the left, the allocator provides the buffer pointer to the organizer role 214a (i.e., a processing role before it has been designated as the organizer role). In some implementations, the role that receives the indication accesses the memory buffer to determine the type of data stored in the memory buffer. In various implementations, the indicator provides information regarding the type of processing needed from the input data.

As also shown, the series of acts 300 includes an act 306 of the organizer role 214a designating itself as an organizer role. In one or more implementations, the buffer management system 202 causes one or more types or roles to self-designate as an organizer role. For example, roles that receive incoming notifications from an allocator are configured to designate themselves as organizer roles and perform a set of corresponding functions (in addition to their normal functions).

In some implementations, the buffer management system 202 designates one of the roles as the organizer role. For instance, the buffer management system 202 (e.g., via the allocator) provides another indicator that assigns a role of a given type or a specific role as the organizer role for processing input data in the memory buffer 210a. In various implementations, the designation of an organizer role is statically determined, determined at run-time, or based on types of roles.

Additionally, the series of acts 300 includes an act 308 of the organizer role 214a determining the number of roles needed to process the input data. In various implementations, part of the functions of an organizer role is to determine which role types are needed to process the input data as well as the total number of roles involved. In some instances, this involves reading and initially processing the input data from the memory buffer 210a. For example, the organizer role 214a determines the number of additional roles needed to consume and process the input data from the memory buffer 210a. Additionally, the organizer role 214a includes itself if it needs to also read from the memory buffer 210a.

As shown, the series of acts 300 includes an act 310 of the organizer role 214a generating an augmented buffer pointer. For example, the organizer role 214a generates an augmented buffer pointer that includes the buffer pointer for the memory buffer 210a as well as augmented information used for efficient deallocation of the memory buffer 210a. In one or more implementations, the augmented buffer pointer also includes a buffer pointer cloning indicator that indicates when the augmented buffer pointer is being provided to multiple additional roles needing to access the memory buffer 210a. In some implementations, the augmented buffer pointer includes the total number of roles, which indicates the number of roles needing to consume and process the input data from the memory buffer 210a.

Additionally, the series of acts 300 includes an act 312 of the organizer role 214a providing the augmented buffer pointer to the consumer roles 214b. In various implementations, the organizer role 214a clones the augmented buffer pointer based on the number of additional roles (e.g., consumer roles) needed to read from the memory buffer 210a. Further, the organizer role 214a sends or passes a clone or copy of the augmented buffer pointer to each of the consumer roles 214b. As noted above, cloning the augmented buffer pointer includes copying a minimal amount of data (e.g., a few bytes). In contrast, existing computer systems that copy whole memory buffers inefficiently require significantly larger amounts of memory on a client device.

As shown, the series of acts 300 includes an act 314 of the organizer role 214a and the consumer roles 214b independently reading from the memory buffer 210a to process the input data. In various implementations, the organizer role 214a and each of the consumer roles 214b utilize the buffer within an instance of the augmented buffer pointer to reference the memory buffer 210a. For instance, each of the roles may perform normal read and deallocate operations based on the augmented buffer pointer as if the role "owned" the memory buffer 210a. Indeed, by utilizing the buffer pointer in the augmented buffer pointer, each role operates as it traditionally would give a normal buffer pointer. Further, in various implementations, the consumer roles 214b may read the buffer pointer field and disregard (or not interpret) any other fields in the augmented buffer pointer, as these additional fields are only meaningful to the organizer role 214a and the buffer monitor 216.

As further shown, the series of acts 300 includes an act 316 of the organizer role 214a sending a deallocation request that includes the augmented buffer pointer to the buffer monitor 216. Similarly, the series of acts 300 includes an act 318 of the consumer roles 214b sending deallocation requests that include the augmented buffer pointer to the buffer monitor 216. For example, upon completing the processing of the input data and memory buffer consumption, each role provides a deallocation request to deallocate the memory buffer 210a.

With existing computer systems, the first role that sends a deallocation request would cause problems for the remaining roles still needing to read from the memory buffer. Instead, as shown, the roles each individually send the allocation request to the buffer monitor 216, which does not deallocate the memory buffer 210a until all roles have finished reading the memory buffer 210a (or when the memory buffer 210a has finished sending the input data to the role), as further described in the subsequent acts. In this manner, the roles operate independently and provide a deallocation request when they are independently done with the memory buffer 210a. Further, the organizer role 214a does not need to track or monitor the progress of any of the consumer roles 214b. Rather, the organizer role 214a sends a deallocation request to the buffer monitor 216, regardless of if it is the first or last role to finish reading from the memory buffer 210a.

In various implementations, along with sending cloned versions of the augmented buffer pointer to the consumer roles 214b, the organizer role sends an augmented buffer pointer and/or the total role number value to the buffer monitor 216. In these implementations, the roles do not need to send the augmented buffer pointer to the buffer monitor 216. Further, when sending only the total role number value to the buffer monitor 216, the buffer monitor 216 may determine when multiple roles are accessing the memory buffer 210a.

As shown in FIG. 3B, the series of acts 300 includes an act 320 of the buffer monitor 216 updating a buffer deallocation table. As noted above, in various implementations, the buffer monitor 216 maintains a buffer deallocation table that passively tracks the allocation state of each memory buffer in a buffer pool. For example, the buffer deallocation table includes an entry for each memory buffer, where an entry includes the total number of roles and the number of deallocation requests (e.g., an integer value specifying the number of deallocation operations received for a given memory buffer). Accordingly, in these implementations, when the buffer monitor 216 receives an augmented buffer pointer, it updates the total number of roles value with the value provided in the augmented buffer pointer. Similarly, when a deallocation request is received, the buffer monitor 216 increments the deallocation number value (or the deallocation number value is initially set to the total number of roles and decremented as new deallocation requests are received until the value reaches zero).

In various implementations, the buffer monitor 216 determines that the augmented buffer pointer is cloned. For instance, the buffer monitor 216 identifies that the buffer pointer cloning indicator in a received augmented buffer pointer indicates cloning. In some cases, an augmented buffer pointer is received in connection with a deallocation request, the buffer monitor 216 recognizes that the deallocation request is to be considered with other deallocation requests from other roles accessing the memory buffer 210a. Otherwise, if a buffer pointer cloning indicator has a false value and is received in connection with a deallocation request, the buffer monitor 216 may deallocate the memory buffer without needing to receive any additional deallocation requests for the memory buffer. As noted above, in some implementations, the buffer monitor 216 deduces the state of the buffer pointer cloning indicator based on the value of the total number of roles indicator.

As shown, the series of acts 300 includes an act 322 of the buffer monitor 216 determining that the last processing role sent a deallocation request. In various implementations, the buffer monitor 216 compares the entries in the buffer deallocation table for a memory buffer to determine when to deallocate the buffer. For example, the buffer monitor 216 determines when the number of deallocation requests matches or equals the total number of roles reading the memory buffer. Indeed, when the number of deallocation requests matches the total number of roles, each role that reads the memory buffer 210a has also sent a deallocation request signaling that it no longer needs to access the memory buffer 210a.

As also shown, the series of acts 300 includes an act 324 of the buffer monitor 216 providing an indication to deallocate the memory buffer 210a. In some implementations, the buffer monitor 216 is able to directly deallocate the memory buffer 210a. In various implementations, the buffer monitor 216 provides an indication to an allocator, which deallocates the memory buffer 210a. In one or more implementations, the buffer monitor 216 sends an indication to a role or other process to deallocate the memory buffer 210a. Accordingly, as shown, the act 326 shows the memory buffer 210a being deallocated.

Additionally, as shown, in some implementations, the series of acts 300 includes an act 328 of the buffer monitor 216 initializing the buffer deallocation table. For example, upon first creating the buffer deallocation table, first allocating a memory buffer, and/or deallocating the memory buffer, the buffer monitor 216 sets the entries for a buffer to zero, null, or another default value. When new values are received (e.g., the total number of roles), the buffer monitor 216 updates the corresponding entries, which are then used to passively determine when to next deallocate the buffer.

In various implementations, the buffer monitor 216 adds some additional bookkeeping over existing computer systems. For example, the buffer monitor 216 maintains a buffer deallocation table. However, unlike existing computer systems, this additional data is small and easily scales as computer hardware devices process increased amounts of data.

In some implementations, the buffer management system 202 follows the pseudocode shown in Listing 1 when a deallocation operation is received to determine when to deallocate a memory buffer.

Listing 1

```
if ABP.IsCloned:
    if ThisBuffer.NumClones == 0:
        ThisBuffer.NumClones = ABP.NumClones
    ThisBuffer.NumDeallocs = ThisBuffer.NumDeallocs + 1
    if ThisBuffer.NumDeallocs == ThisBuffer.NumClones:
        Deallocate this buffer
else // the ABP is not cloned
    Deallocate this buffer
```

As shown in Listing 1, ABP refers to an augmented buffer pointer, IsCloned refers to a Boolean flag indicating if the augmented buffer pointer is cloned, NumClones refers to an integer value specifying the number of clones or roles associated with the augmented buffer pointer (i.e., the total number of roles), and NumDeallocs refers to an integer value specifying the number of deallocation operations received for the memory buffer.

Walking through Listing 1, the buffer management system 202 first determines if an augmented buffer pointer is cloned. If not, the buffer management system 202 deallocates the memory buffer (i.e., the else clause at the bottom). If the augmented buffer pointer is cloned, the buffer management system 202 then determines if the value of the number of clones/roles in the buffer monitor 216 (in the buffer deallocation table) is zero (or null or a default value). If zero, meaning the number of clones/roles has not yet been determined, the buffer management system 202 additionally sets the number of clones/roles in the buffer monitor 216 to that of the total number of roles specified in the augmented buffer pointer. Otherwise, if the value of the number of clones/roles in the buffer monitor 216 is non-zero (i.e., the number of clones/roles has already been determined), the buffer management system 202 skips the above step.

Additionally, as shown in Listing 1, the buffer management system 202 increments the deallocation number for the memory buffer stored in the buffer monitor 216. Upon incrementing the deallocation number, the buffer management system 202 determines if the value of the deallocation number matches the value of the number of clones/roles in the buffer monitor 216 and, if so, deallocates the memory buffer. Otherwise, the buffer management system 202 postpones the deallocation of the memory buffer at least until an additional deallocation operation/request arrives.

As provided above, in some implementations, the buffer management system 202 performs fewer steps to determine when to deallocate a memory buffer. For example, the buffer management system 202 simply increments the deallocation number and then determines whether the deallocation number equals or is above the total number of roles in the augmented buffer pointer.

Figure 4A:
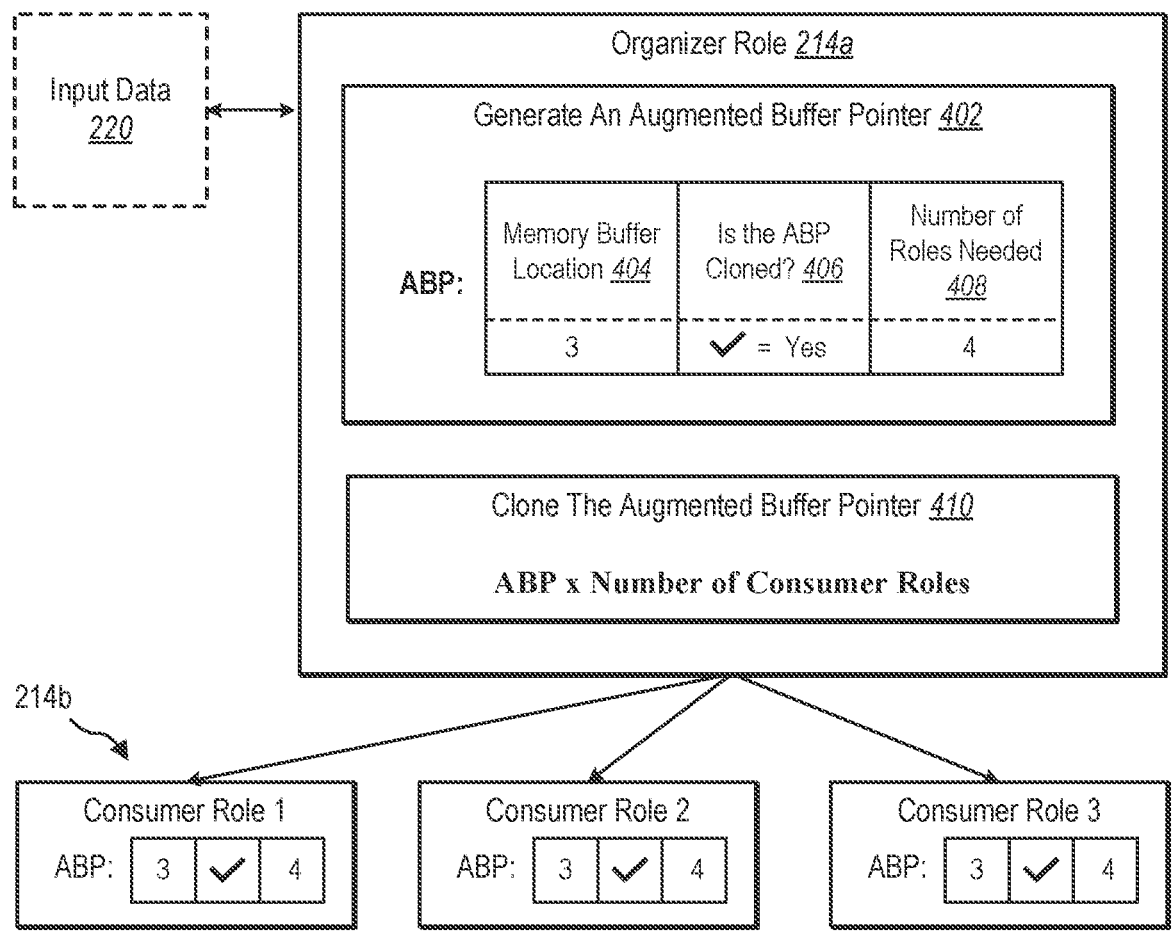
FIG. 4A illustrates a diagram of generating an augmented buffer pointer at an organizer role and providing the augmented buffer pointer to consumer roles in accordance with one or more implementations.

As mentioned above, FIGS. 4A-4B correspond to organizer roles and augmented buffer pointers. In particular, FIG. 4A illustrates a diagram of generating an augmented buffer pointer at an organizer role and providing the augmented buffer pointer to consumer roles. As shown, FIG. 4A includes the organizer role 214a, the consumer roles 214b, and the input data 220 introduced above.

As illustrated, the organizer role 214a performs an act 402 of generating an augmented buffer pointer (ABP). As shown in the example illustration, the augmented buffer pointer includes three fields. The first field 404 corresponds to a memory buffer location, the second field 406 corresponds to whether the ABP (augmented buffer pointer) is cloned (e.g., IsCloned), and the third field 408 corresponds to the number of roles needed to process to input data 220 (e.g., NumClones).

As shown by the value of the first field 404, the memory buffer included in the augmented buffer pointer shows that the input data 220 is stored at Memory Buffer 3. Similarly, based on analyzing the input data 220, the organizer role 214a determines that additional roles are needed, which is indicated by the value (i.e., checkmark="yes") of the second field 406, and that the total number of roles reading from the memory buffer is 4, which is shown by the value of the third field 408. As mentioned above, in various implementations, the total number of roles includes each of the roles that need to read the input data 220 from the memory buffer, which may include the organizer role 214a.

As also illustrated, the organizer role 214a performs an act 410 of cloning the augmented buffer pointer. In various implementations, the organizer role 214a generates copies of the augmented buffer pointer where the number of copies is based on the number of consumer roles 214b needed. Additionally, the organizer role 214a passes (e.g., directly or indirectly) the cloned augmented buffer pointers to the consumer roles 214b. As shown, each of the consumer roles 214b includes a clone of the augmented buffer pointer.

Figure 4B:
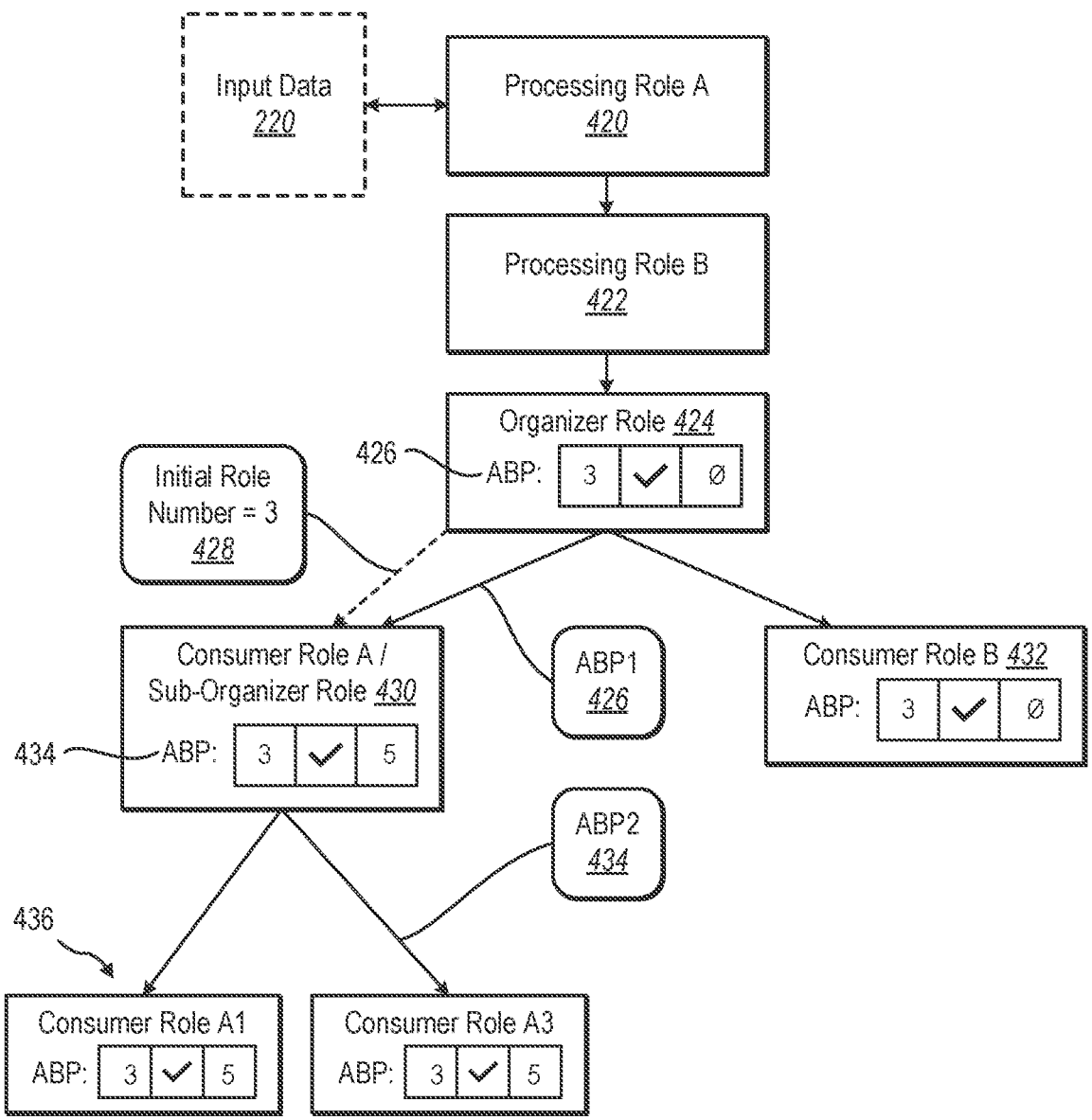
FIG. 4B illustrates a diagram of generating an augmented buffer pointer at a sub-organizer role in accordance with one or more implementations.

FIG. 4B illustrates a diagram of generating an augmented buffer pointer at a sub-organizer role in accordance with one or more implementations. As shown, FIG. 4B includes the input data 220, a first processing role 420, a second processing role 422, an organizer role 424, a sub-organizer role 430, a consumer role 432, and additional consumer roles 436. In particular, FIG. 4B shows an implementation where the first role to receive the indication of the input data 220 being received is not designated as the organizer role.

To elaborate, the first processing role 420 receives an indication that the input data 220 has been received and stored in a memory buffer. For example, an allocator or buffer pool sends a memory buffer to the first processing role 420. Based on the first processing role 420 determining that it is not suited to initially process the input data 220, the first processing role 420 passes the indication and/or the memory buffer to the second processing role 422. Similarly, the second processing role 422 also determines that it is not suited to initially process the input data 220 and passes the indication and/or the memory buffer to a third processing role.

As shown, the third processing role determines that it is able to initially process the input data 220, and it is designated as the organizer role 424. As part of determining the number of roles needed to process the input data 220, the organizer role 424 identifies that additional roles are needed, but it is unable to determine the total number of roles needed. For example, the organizer role 424 determines that one of the consumer roles will call additional roles, but the organizer role 424 is unable to determine the number of additional consumer roles that will be called.

Accordingly, as shown, the organizer role 424 generates an augmented buffer pointer 426 that includes the buffer pointer and an indication that the augmented buffer pointer is being cloned. Further, because the organizer role 424 is unable to determine the total number of roles or clones, the organizer role 424 provides a value of 0 for the total number of roles field. The organizer role 424 then passes the augmented buffer pointer 426 (e.g., ABP1) to the first level of consumer roles labeled Consumer Role A and Consumer Role B (e.g., the sub-organizer role 430 and the consumer role 432).

Additionally, as shown, the organizer role 424 passes an additional indicator to the sub-organizer role 430. In various implementations, the additional indication is an initial role number indication 428 that signals how many roles the organizer role 424 determined would initially read the memory buffer having the input data 220. For example, based on the organizer role 424 determining that itself and the two first-level consumer roles would read the memory buffer, the organizer role 424 passes an initial role number indication 428 having the value of 3. In the case that the organizer role 424 determines that it did not need to read the memory buffer, it would pass and initial role number indication 428 having the value of 2.

As shown, the sub-organizer role 430 receives the initial role number indication 428 in addition to receiving the augmented buffer pointer 426. Upon the sub-organizer role 430 determining that three additional consumer roles are needed to read the memory buffer, the sub-organizer role 430 generates an updated augmented buffer pointer 434, which is passed on to the additional consumer roles 436 (e.g., as ABP2).

As illustrated, the sub-organizer role 430 determines the total number of roles needed when generating the updated augmented buffer pointer 434. In various implementations, the sub-organizer role 430 combines the value of the initial role number indication 428 (i.e., 3) with the determined number of additional consumer roles 436 (i.e., 2) to determine the total number of roles (i.e., 5).

As described above, the buffer management system 202 efficiently deallocates memory buffers using a combination of augmented buffer pointers and a buffer monitor (e.g., a buffer bookkeeper). In implementations such as those shown in FIG. 4B, the buffer monitor is able to easily determine when all roles have accessed the memory buffer. To illustrate, when the buffer monitor receives an augmented buffer pointer (in connection with a deallocation request) that indicates a total number of roles having a value of 0 (and/or in connection with the IsCloned flag set to true), the buffer monitor identifies that multiple roles are reading from the memory buffer and that the total number of roles was initially unknown. Accordingly, the buffer monitor waits until the updated augmented buffer pointer is received to identify the total number of roles.

In some implementations, an updated augmented buffer pointer will be received before an initial augmented buffer pointer. In these instances, the buffer monitor disregards the total number of roles field in the initial augmented buffer pointer as the buffer monitor already knows the total number of roles needed to process the input data based on the previously received updated augmented buffer pointer. Additionally, for each augmented buffer pointer received in connection with a deallocation request (e.g., both initial and updated augmented buffer pointers), the buffer monitor increments the value for the number of deallocation requests field. In this manner, the buffer management system 202 is still able to efficiently allocate and deallocate memory buffers even if the total number of roles needed to process input data is initially unknown.

Figure 5:
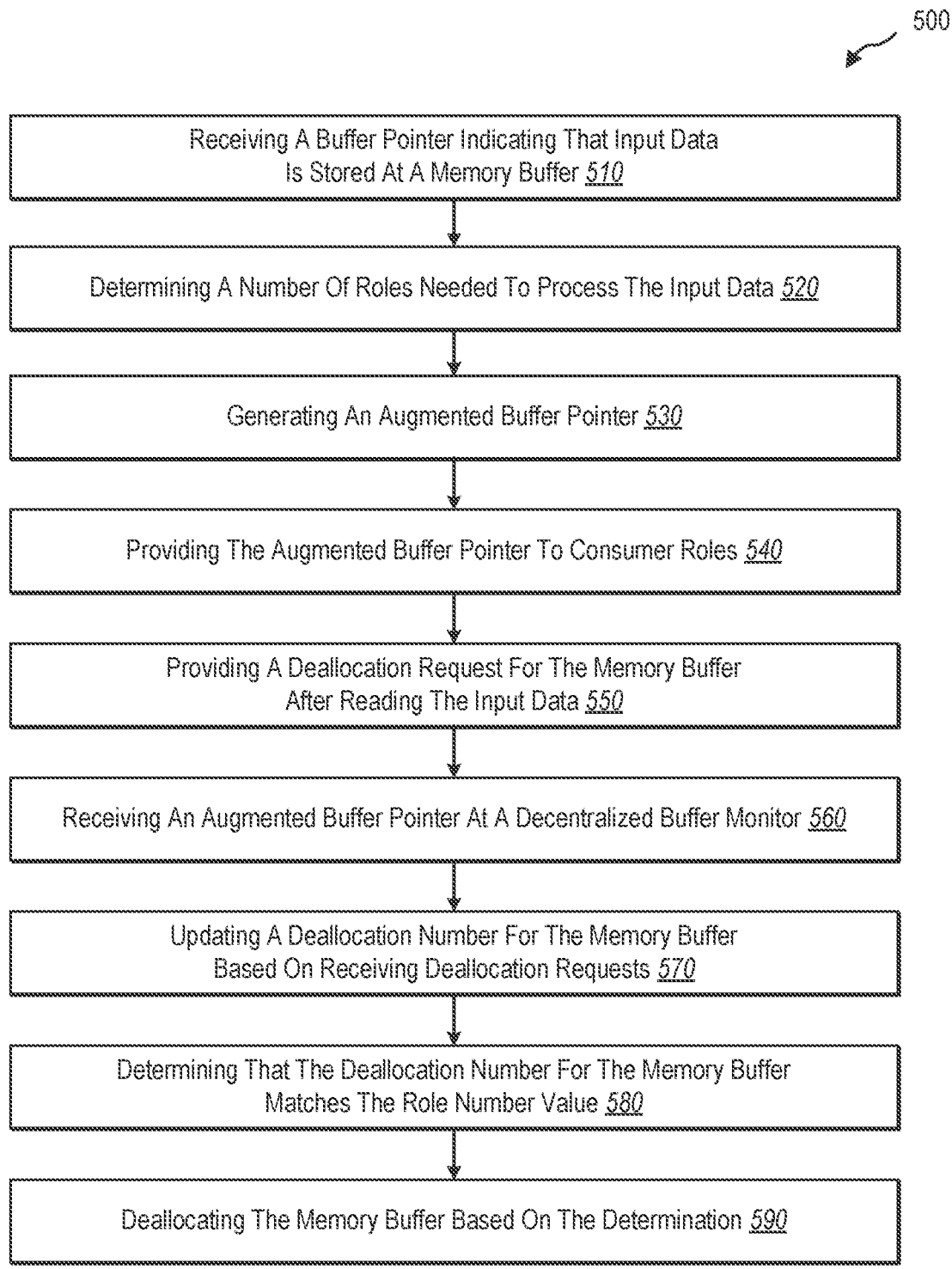
FIG. 5 illustrates an example series of acts for efficiently allocating and deallocating a memory buffer shared by multiple processing roles in accordance with one or more implementations.

Turning now to FIG. 5, this figure illustrates an example flowchart that includes a series of acts 500 for utilizing the buffer management system 202 in accordance with one or more implementations. In particular, FIG. 5 illustrates an example series of acts 500 for efficiently deallocating a memory buffer shared by multiple processing roles in accordance with one or more implementations. Furthermore, the acts of FIG. 5 can be performed as part of a method. Alternatively, a non-transitory computer-readable medium can include instructions that, when executed by one or more processors, cause a computing device to perform the acts 500 of FIG. 5. In still further implementations, a system can perform the acts 500 of FIG. 5. In some implementations, a processing role and/or a buffer monitor perform one or more of the acts of the series of acts 500.

As shown, the series of acts 500 includes an act 510 of receiving a buffer pointer indicating that input data is stored at a memory buffer. For instance, in example implementations, the act 510 involves receiving, from an allocator, a buffer pointer indicating that input data is stored at a target memory buffer of a pool of memory buffers. In one or more implementations, the act 510 includes receiving, at an organizer processing role, the buffer pointer to the memory buffer in connection with an indication to process the input data in the memory buffer. In various implementations, an organizer processing role is designated as an organizer from among a plurality of processing roles based on the organizer processing role receiving the buffer pointer.

In some implementations, the act 510 includes receiving, by an allocator, input data to be processed; storing, by the allocator, the input data in the memory buffer as the input data; and notifying, by the allocator, a processing role of the plurality of processing roles that the input data is stored in the memory buffer. In some implementations, the processing role designates itself as the organizer processing role upon receiving a notification from the allocator.

As further shown, the series of acts 500 includes an act 520 of determining a number of roles needed to process the input data. For instance, in example implementations, the act 520 involves determining, based on the input data, a number of processing roles needed to process the input data. In some implementations, the act 520 includes determining, by an organizer processing role of the plurality of processing roles, a number of processing roles needed to process the input data. In various implementations, the organizer processing role and the consumer processing role perform different processing functions.

As also shown, the series of acts 500 includes an act 530 of generating an augmented buffer pointer. For instance, in example implementations, the act 530 involves generating an augmented buffer pointer that includes the buffer pointer, a buffer pointer cloning indicator, and a role number value (i.e., total number of roles value) indicating the number of processing roles needed to process the input data. In some implementations, an organizer processing role generates the augmented buffer pointer.

As shown, the series of acts 500 additionally includes an act 540 of providing the augmented buffer pointer to consumer roles. For instance, in example implementations, the act 540 involves providing the augmented buffer pointer to a plurality of consumer processing roles corresponding to the number of processing roles needed to process the input data. In one or more implementations, the act 540 includes providing, by the organizer processing role, the augmented buffer pointer to the plurality of consumer processing roles. In some implementations, the act 540 includes providing cloned versions of the augmented buffer pointer to a plurality of consumer processing roles of the plurality of processing roles. In various implementations, the cloned versions of the augmented buffer pointer each include a copy of the buffer pointer.

In various implementations, the act 540 includes a consumer processing role utilizing the buffer pointer received in an augmented buffer pointer to independently access the input data in the memory buffer separately from other processing roles accessing the input data in the buffer pointer. For example, in some implementations, the input data is read from the target memory buffer independently from other processing roles of the plurality of consumer processing roles reading the input data. In one or more implementations, the number of processing roles needed to process the input data includes the organizer processing role and the plurality of consumer processing roles.

Additionally, as shown, the series of acts 500 includes an act 550 of providing a deallocation request for the memory buffer after reading the input data. For instance, in example implementations, the act 550 involves providing a deallocation request for the target memory buffer after reading the input data from the target memory buffer. In various implementations, the act 550 includes providing, by a consumer processing role of the plurality of consumer processing roles, a deallocation request to deallocate the memory buffer after the consumer processing role utilizes the augmented buffer pointer to read the input data from the memory buffer.

As shown, the series of acts 500 includes an act 560 of receiving an augmented buffer pointer at a decentralized buffer monitor. For instance, in example implementations, the act 560 involves receiving an augmented buffer pointer that includes a buffer pointer to a memory buffer of a pool of memory buffers, a buffer pointer cloning indicator set to true when the buffer pointer is cloned to multiple processing roles, and a role number value indicating a number of processing roles needed to process incoming data stored in the memory buffer. In various implementations, the buffer pointer cloning indicator within the augmented buffer pointer indicates that multiple instances of the augmented buffer pointer, including multiple instances of the buffer pointer, are provided to multiple instances of processing roles.

As further shown, the series of acts 500 includes an act 570 of updating a deallocation number for the memory buffer based on receiving deallocation requests. For instance, in example implementations, the act 570 involves updating a deallocation number for the memory buffer based on receiving a first deallocation request from an organizer processing role and/or a second deallocation request from a consumer processing role. In some implementations, the act 570 includes generating (e.g., by a decentralized buffer monitor) a number of received deallocation requests based on receiving deallocation requests from the plurality of consumer processing roles and the organizer processing role.

In one or more implementations, the act 570 includes maintaining (e.g., by a decentralized buffer monitor) a buffer deallocation table that includes a row for each memory buffer in the memory buffer pool. In various implementations, the deallocation request is provided before a consumer processing role of the plurality of consumer processing roles has finished accessing the input data from the target memory buffer. In example implementations, the act 570 includes updating values within the memory buffer deallocation table as deallocation requests are received.

As also shown, the series of acts 500 includes an act 580 of determining that the deallocation number for the memory buffer matches the role number value. For instance, in example implementations, the act 580 involves determining that the deallocation number for the memory buffer matches the role number value of the augmented buffer pointer. In one or more implementations, the act 580 includes determining that a number of received deallocation requests from the plurality of consumer processing roles and the organizer processing role equals the role number value of the augmented buffer pointer.

As shown, the series of acts 500 additionally includes an act 590 of deallocating the memory buffer based on the determination. For instance, in example implementations, the act 590 involves providing a deallocation indicator to deallocate the memory buffer based on determining a match. In various implementations, the act 590 includes deallocating the memory buffer based on determining that the plurality of consumer processing roles and the organizer processing role have each provided a deallocation request to deallocate the memory buffer. In some implementations, the act 590 includes postponing the deallocation of the memory buffer while the number of received deallocation requests is less than the role number value of the augmented buffer pointer.

In one or more implementations, the act 590 includes initializing, by the decentralized buffer monitor, an entry for the memory buffer upon the memory buffer being deallocated. In sample implementations, initializing the entry for the memory buffer includes setting a number of received deallocation requests to zero and a role number value to zero. In some implementations, the act 590 includes initializing a memory buffer deallocation table upon the memory buffer becoming deallocated. In various implementations, the act 590 includes providing a deallocation indicator to deallocate the memory buffer upon determining that the buffer pointer cloning indicator is set to false.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network (i.e., computer network) or data link can be buffered in RAM within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by a processor, cause a general-purpose computer, special purpose computer, or special purpose processing device to perform a certain function or group of functions. In some implementations, computer-executable instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 6:
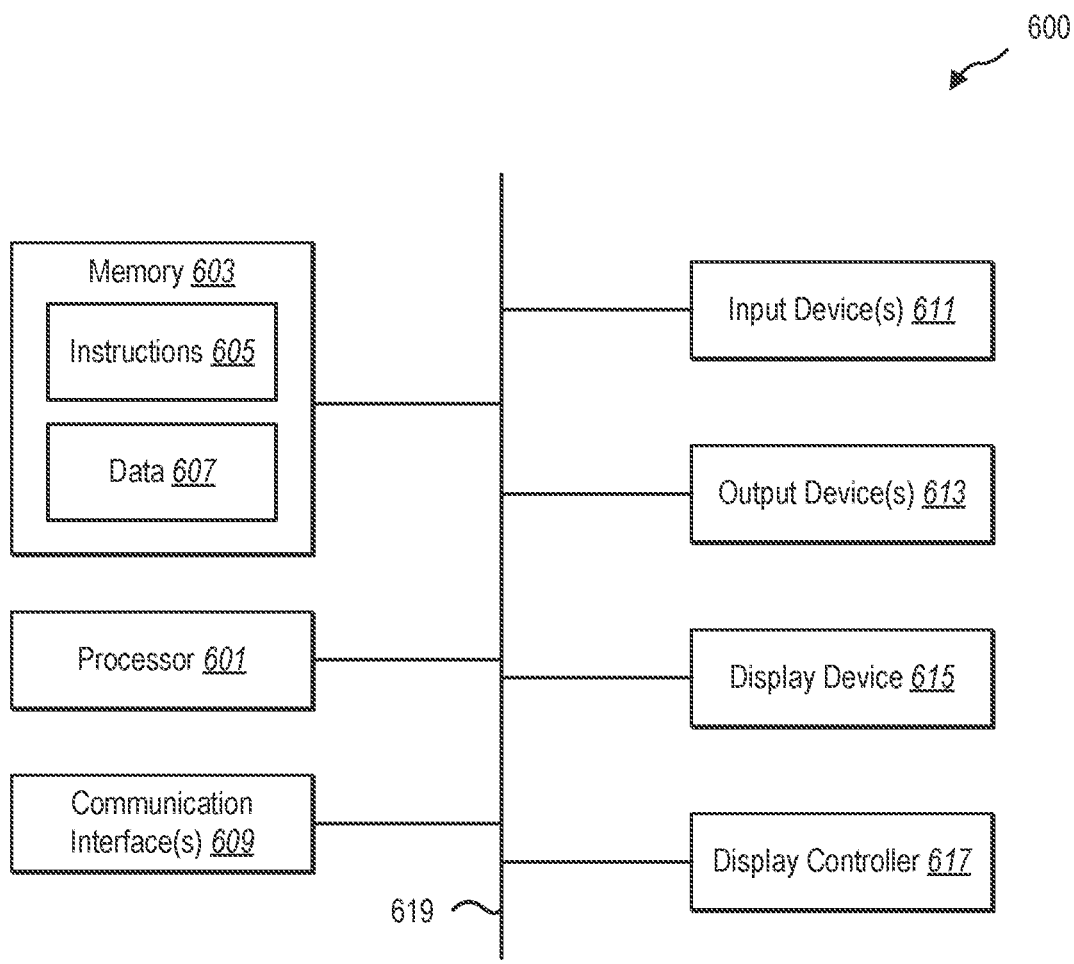
FIG. 6 illustrates example components included within a computer system.

FIG. 6 illustrates certain components that may be included within a computer system 600 (e.g., a computer hardware device). The computer system 600 may be used to implement the various computing devices, components, and systems described herein.

In various implementations, the computer system 600 may represent one or more of the client devices, server devices, or other computing devices that implement the computer hardware device described above. For example, the computer system 600 may refer to various types of network devices capable of accessing data on a network (i.e., a computer network), a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 600 includes a processor 601. The processor 601 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although the processor 601 shown is just a single processor in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory

603 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 605 and the data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during the execution of the instructions 605 by the processor 601.

A computer system 600 may also include one or more communication interface(s) 609 for communicating with other electronic devices. The one or more communication interface(s) 609 may be based on wired communication technology, wireless communication technology, or both. Some examples of the one or more communication interface(s) 609 include a Universal Serial Bus (USB), an Ethernet adapter, a wireless adapter that operates in accordance with an Institute of Electrical and Electronics Engineers (IEEE) 602.11 wireless communication protocol, a Bluetooth® wireless communication adapter, and an infrared (IR) communication port.

A computer system 600 may also include one or more input device(s) 611 and one or more output device(s) 613. Some examples of the one or more input device(s) 611 include a keyboard, mouse, microphone, remote control device, button, joystick, trackball, touchpad, and light pen. Some examples of the one or more output device(s) 613 include a speaker and a printer. A specific type of output device that is typically included in a computer system 600 is a display device 615. The display device 615 used with implementations disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network (i.e., computer network), both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified.

The term "determining" encompasses a variety of actions. For example, "determining" can include calculating, computing, processing, deriving, investigating, looking up (e.g., looking up in a table, a database, or another data structure), ascertaining, etc. Also, "determining" can include receiving (e.g., receiving information), accessing (e.g., accessing data in a memory), etc. Additionally, "determining" can include resolving, selecting, choosing, establishing, etc.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is therefore indicated by the appended claims rather than by the foregoing description. Changes that come within the meaning and range of equivalency of the claims are to be embraced within their scope.

What is claimed is:

1. A computer hardware device comprising:
a memory buffer within a memory buffer pool, the memory buffer having input data to be processed;
a buffer pointer that references the memory buffer having the input data; and
a plurality of processing roles for processing data;
wherein the computer hardware device causes the memory buffer to be deallocated by:
determining, by an organizer processing role of the plurality of processing roles, an initial number of processing roles needed to process the input data;
generating, by the organizer processing role, a first augmented buffer pointer that comprises the buffer pointer, a buffer pointer cloning indicator, and a null role number value indicating that a total number of processing roles needed to process the input data is initially unknown;
providing cloned versions of the first augmented buffer pointer to a plurality of consumer processing roles of the plurality of processing roles including a sub-organizer processing role;
determining, by the sub-organizer processing role, an additional number of processing roles needed to process the input data;
generating, by the sub-organizer processing role, an updated role number value indicating the total number of processing roles by combining the initial number of processing roles with the additional number of processing roles;
providing, by a consumer processing role of the plurality of consumer processing roles, a deallocation request to deallocate the memory buffer after the consumer processing role utilizes the first augmented buffer pointer; and
deallocating the memory buffer based on determining that a number of received deallocation requests received from processing roles match the updated role number value indicating the total number of processing roles.

2. The computer hardware device of claim 1, wherein the computer hardware device further causes the memory buffer to be deallocated by generating, by the sub-organizer processing role, a second augmented buffer pointer that comprises the buffer pointer, the buffer pointer cloning indicator, and the updated role number value indicating the total number of processing roles needed to process the input data.

3. The computer hardware device of claim 2, wherein the computer hardware device further causes the memory buffer to be deallocated by providing, by the sub-organizer processing role, the second augmented buffer pointer to additional consumer processing roles called by the sub-organizer processing role.

4. The computer hardware device of claim 2, wherein the computer hardware device further causes the memory buffer to be deallocated by providing, by the sub-organizer processing role, the second augmented buffer pointer with the updated role number value indicating the total number of processing roles needed to process the input data.

5. The computer hardware device of claim 2, wherein the computer hardware device further causes the memory buffer to be deallocated by postponing deallocation of the memory buffer while the number of received deallocation requests is less than the updated role number value of the second augmented buffer pointer.

6. The computer hardware device of claim 1, wherein the computer hardware device further causes the memory buffer to be deallocated by deallocating the memory buffer based on the memory buffer:
receiving the null role number value from the organizer processing role;
receiving the updated role number value from the sub-organizer processing role; and
replacing the null role number value with the updated role number value.

7. The computer hardware device of claim 1, wherein the computer hardware device further causes the memory buffer to be deallocated by generating, by a decentralized buffer monitor, the number of received deallocation requests based on receiving deallocation requests from the plurality of consumer processing roles including the sub-organizer processing role and the organizer processing role.

8. The computer hardware device of claim 1, wherein the computer hardware device further causes the memory buffer to be deallocated by:
receiving, by an allocator, the input data to be processed;
storing, by the allocator, the input data in the memory buffer as the input data; and
notifying, by the allocator, a processing role of the plurality of processing roles that the input data is stored in the memory buffer,
wherein the processing role designates itself as the organizer processing role upon receiving a notification from the allocator.

9. The computer hardware device of claim 1, wherein the computer hardware device further causes the memory buffer to be deallocated by:
maintaining, by a decentralized buffer monitor, a buffer deallocation table that comprises a row for each memory buffer in the memory buffer pool; and
initializing, by the decentralized buffer monitor, an entry for the memory buffer upon the memory buffer being deallocated,
wherein initializing the entry for the memory buffer comprises setting the number of received deallocation requests to zero and a role number value to zero.

10. The computer hardware device of claim 1, wherein the organizer processing role and the plurality of consumer processing roles, excluding the sub-organizer processing role, perform different processing functions.

11. The computer hardware device of claim 1, wherein:
the cloned versions of the first augmented buffer pointer each comprise a copy of the buffer pointer; and
the consumer processing role utilizes the buffer pointer received in the first augmented buffer pointer to access the input data in the memory buffer independently from other processing roles accessing the input data in the buffer pointer.

12. An organizer processing role of a computer hardware device that performs steps of:
receiving, from an allocator, a buffer pointer indicating that input data is stored at a target memory buffer of a pool of memory buffers;
determining, based on the input data, an initial number of processing roles needed to process the input data, wherein the initial number of processing roles is determined to not be a total number of processing roles needed to process the input data;

generating a first augmented buffer pointer that comprises the buffer pointer, a buffer pointer cloning indicator, and a null role number value indicating that the total number of processing roles is initially unknown;

providing the first augmented buffer pointer to a plurality of consumer processing roles;

providing the initial number of processing roles indicating the initial number of processing roles needed to process the input data to a first consumer processing role of the plurality of consumer processing roles, wherein the initial number of processing roles causes the first consumer processing role to:

determine an additional number of processing roles needed to process the input data; and generate the total number of processing roles by combining the initial number of processing roles with the additional number of processing roles; and providing a deallocation request for the target memory buffer after reading the input data from the target memory buffer.

13. The organizer processing role of claim 12, wherein the first consumer processing role is designated as a sub-organizer processing role.

14. The organizer processing role of claim 12, wherein:
the buffer pointer is received from the allocator; and
the organizer processing role is designated as an organizer from among a plurality of processing roles based on the organizer processing role receiving the buffer pointer.

15. The organizer processing role of claim 12, wherein the deallocation request is provided before a consumer processing role of the plurality of consumer processing roles has finished accessing the input data from the target memory buffer.

16. The organizer processing role of claim 12, wherein the input data is read from the target memory buffer independently from other processing roles of the plurality of consumer processing roles reading the input data.

17. A decentralized buffer monitor of a computer hardware device that performs steps of:

receiving a first augmented buffer pointer that comprises a buffer pointer to a memory buffer of a pool of memory buffers, a buffer pointer cloning indicator that indicates when the buffer pointer is cloned to multiple processing roles, and a null role number value indicating an unknown number of processing roles needed to process incoming data stored in the memory buffer;

receiving a second augmented buffer pointer that comprises the buffer pointer, the buffer pointer cloning indicator, and a total role number value indicating a total number of processing roles needed to process the incoming data stored in the memory buffer;

based on receiving a first deallocation request from an organizer processing role, updating a deallocation number for the memory buffer;

based on receiving a second deallocation request from a consumer processing role, updating the deallocation number for the memory buffer;

determining that the deallocation number for the memory buffer matches the total role number value of the second augmented buffer pointer; and based on determining a match, providing a deallocation indicator to deallocate the memory buffer.

18. The decentralized buffer monitor of claim 17, further comprising performing a step of initializing a memory buffer deallocation table upon the memory buffer becoming deallocated.

19. The decentralized buffer monitor of claim 18, further comprising performing an additional step of updating values within the memory buffer deallocation table as deallocation requests are received.

20. The decentralized buffer monitor of claim 17, further comprising performing additional steps of:

replacing the null role number value with the total role number value when the first augmented buffer pointer is received before the second augmented buffer pointer; or disregarding the null role number value and maintaining the total role number value when the second augmented buffer pointer is received before the first augmented buffer pointer.

* * * * *